Jan. 28, 1964
A. KOTT ETAL
3,119,719
COMPACTING STARCH
Filed Dec. 2, 1959
4 Sheets-Sheet 2
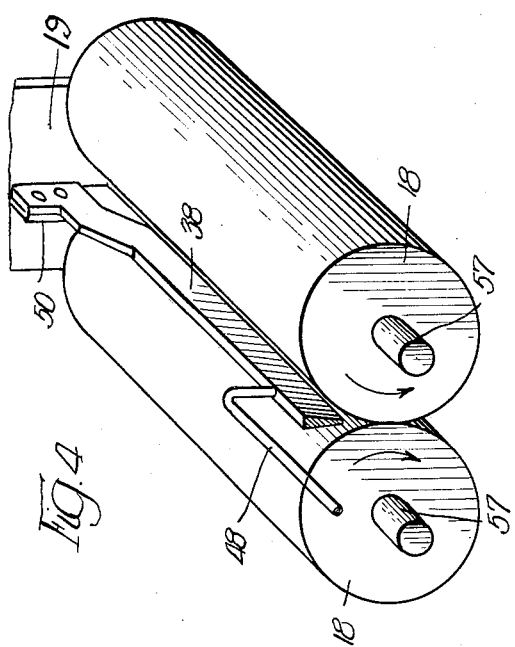
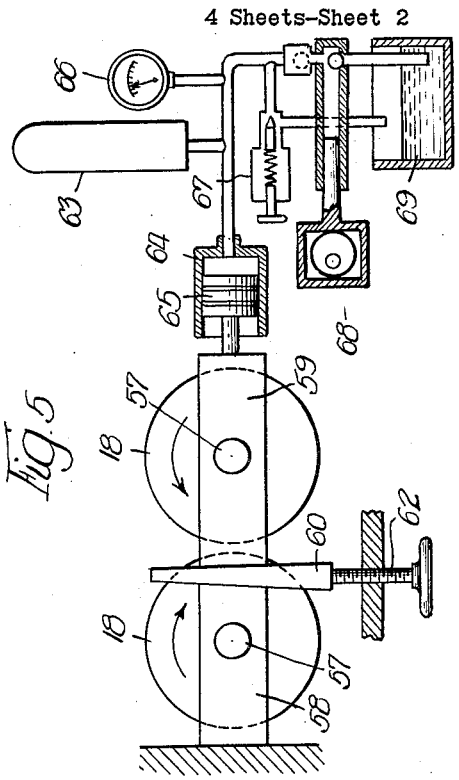
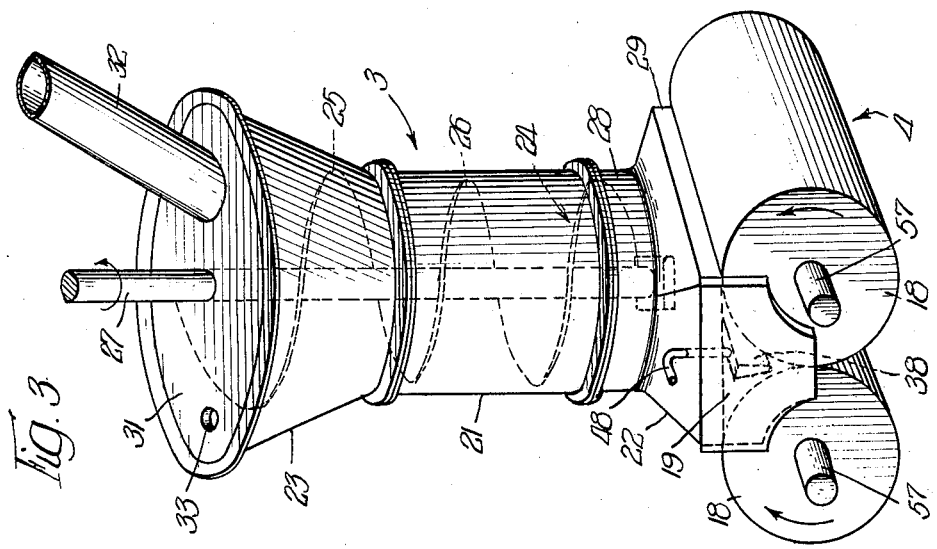
INVENTOR.
Arthur Kott &
BY Richard M. Olson,
Mildred Oncken
atty.

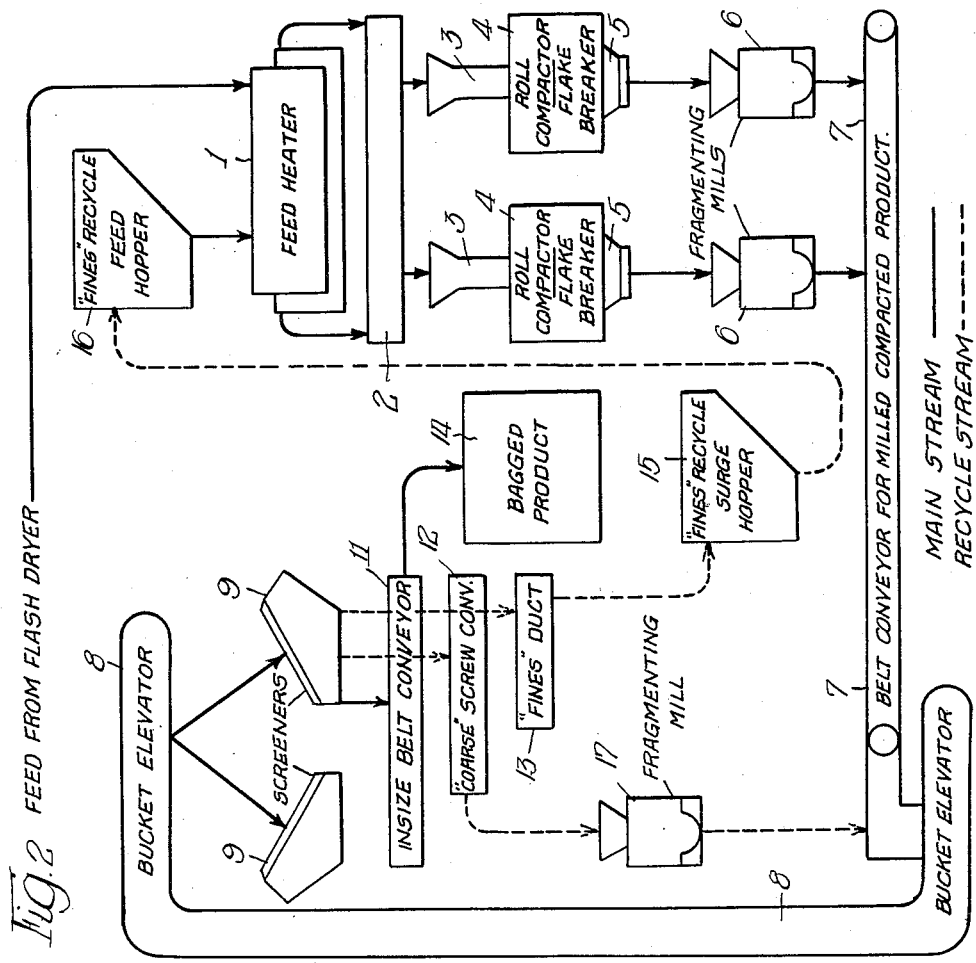
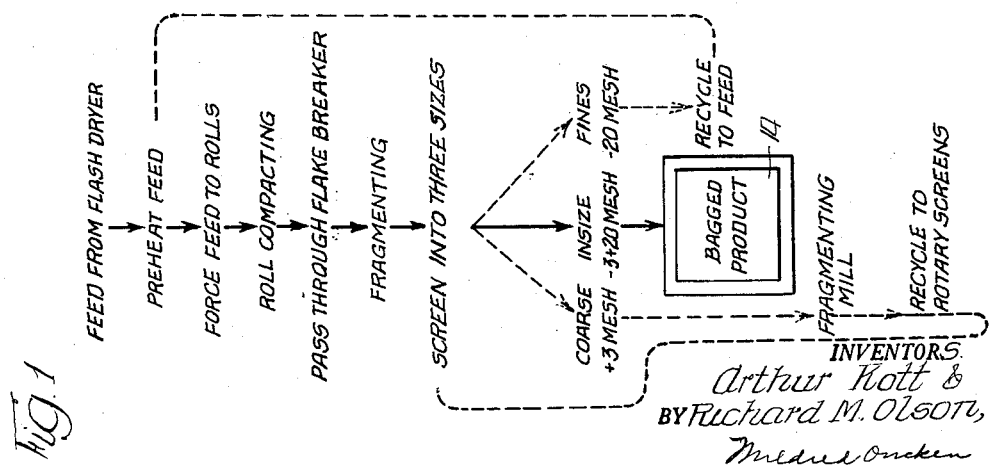

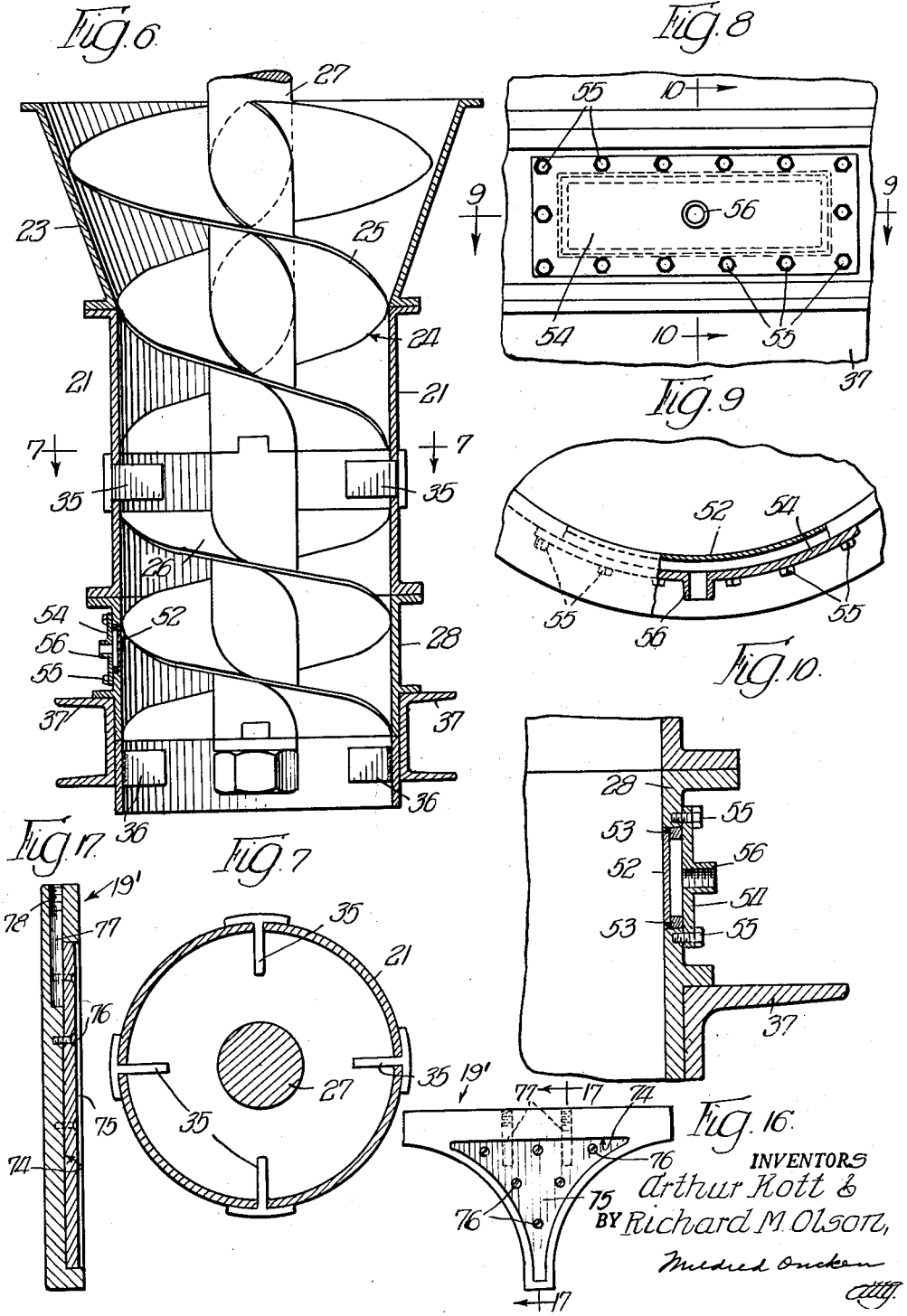

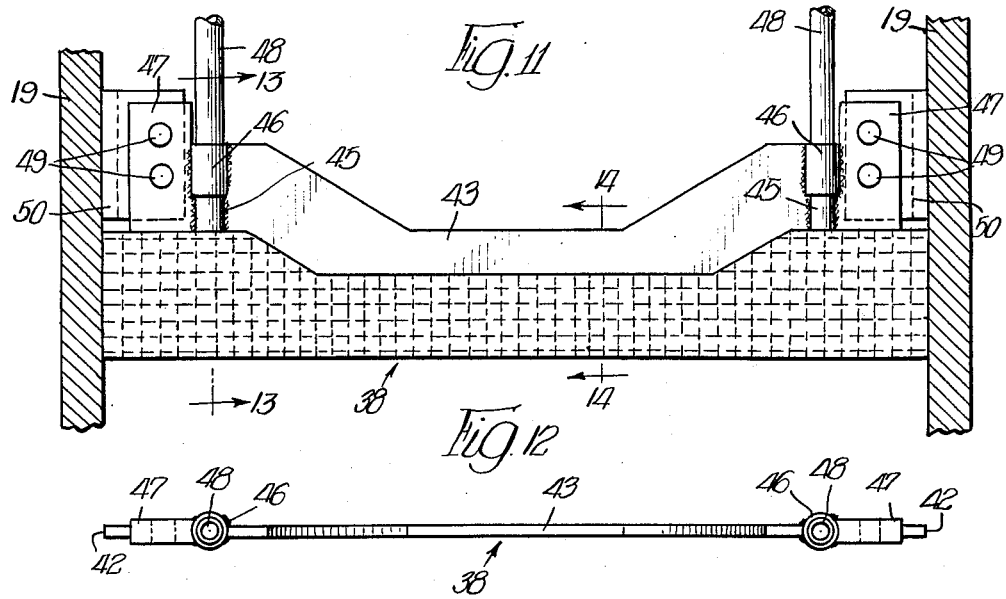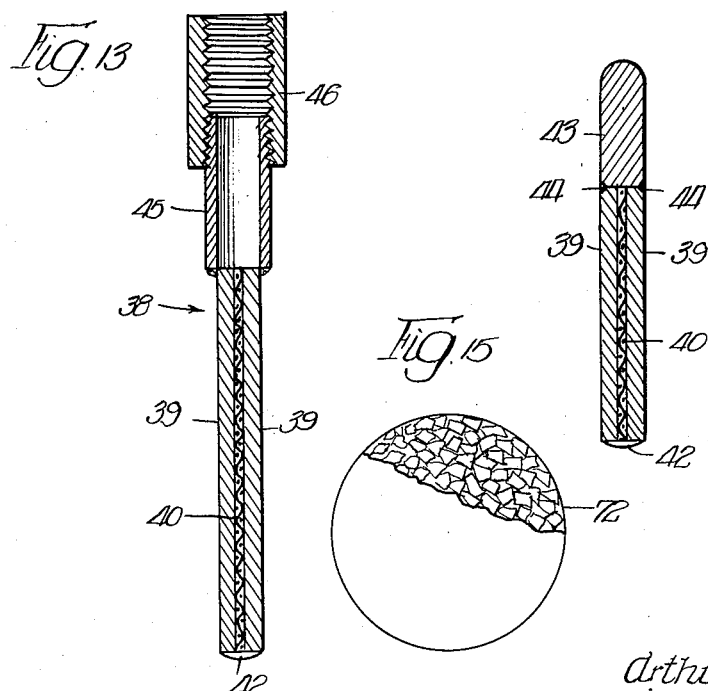
INVENTORS.
Arthur Kott &
BY Richard M. Olson,

United States Patent Office 3,119,719
Patented Jan. 28, 1964

3,119,719
COMPACTING STARCH
Arthur Kott, Chicago, and Richard M. Olson, North Riverside, Ill., assignors to Corn Products Company, New York, N.Y., a corporation of Delaware
Filed Dec. 2, 1959, Ser. No. 856,730
5 Claims. (Cl. 127—71)

The primary object of the present invention is the production of a new physical form of starch. Further objects are to provide a method of and means for producing the same.

The novel product of the present invention is a hard, grain-like mobile form of starch which is readily dispersible in water and which exhibits no changes in physical and chemical properties over the loose or uncompacted form of starch from which it is produced, except that it is compacted into a flake or sheet which is broken and screened to a predetermined size or range of sizes. It is suitable for household or other use, and has the useful properties and capabilities of such prior forms of starch as lump, crystal, grit and pearl starch products, and it is free of dust as produced, and it is sufficiently hard, cohesive and abrasion resistant to permit of shipment, handling and pouring with substantial freedom from evolution of dust. We designate it herein a dustless starch.

The production of a dustless starch has long been an unattained objective of the starch industry. Various processes for the purpose have been devised as the patented art reveals, but while the demand for such a process and product has been persistent, so far as we have been able to ascertain, none has been forthcoming.

A basic concept of the present invention is to compact a loose or powdered starch having a moisture content of about 8% to 17% at a temperature of from about 40° F. to about 180° F., by mechanical pressure into a hard, flat, parallel sided flake of substantially the same density throughout its cross section without producing change in the nature of the starch granules for the normal uses thereof. In the present specification and claims we employ the term "granules" in reference to the small bodies of naturally occurring starch. The term "flake" or "sheet" designates the compacted body of more or less continuous character coming from the relatively smooth rolls by which the material is compacted. The term "compacted particles" or "compacted fragments" or "compacted grains" refer to pieces of said body of compacted granules. Said compacting is to be done by pressure alone, that is, without additives, such as binders, to make the granules stick together and without producing gelatinization or incipient gelatinization which would interfere with the dispersibility or other useful properties of the starch.

We are aware that it has been proposed to compact starch granules by producing incipient gelatinization or so much surface gelatinization as will produce adhesion of the granules to each other. This has been attempted by combination of heat and pressure. See Jefferies No. 2,098,293 and Horesi No. 2,168,524, which pass the starch through cocurrent rolls. Also, it has been done by pressure and various degrees and kinds of mechanical working of the starch in the course of extrusion as in Gill No. 2,214,018; rubbing between rolls operating at different speeds, as in Hansen No. 2,464,018, and briquetting between fluted rolls with offset flutes, as in Smith No. 2,907,685. Gelatinization is undesirable, since it changes the character and performance of the starch. To produce only so much as will make the granules stick together and no more is too delicate a matter to be feasible. But it has heretofore been thought to be necessary to produce a definite amount of gelatinization to make the granules stick together.

For the compaction of starch or like materials with minimum change in the physical characteristics thereof, particularly with respect to the water suspendability or dispersibility, it is desirable to operate upon a finely divided material. Such material reacts more uniformly to the high compacting pressure of the rolls. Thus it is desirable to employ dry starch in powder form as distinguished from lumpy or non-uniform material inasmuch as lumps under high compression react differently to the applied pressure than a finely divided material of substantially uniform grain size. Lumps will tend to produce a product of non-uniform character, that is, some parts will be partially gelatinized or sufficiently changed as to give a non-uniform effect in use, inferior to that of the original material. Also, the distribution of moisture throughout a mass of powdered starch will generally be more nearly uniform than will occur with lumpy starch unless particular attention is paid to this requirement. The full capability of finely divided material is not realized unless the surface of the rolls is substantially uniform, i.e., smooth and cylindrical. Irregular briquetting pockets or flutes produce uneven compression by the rolls even though the particles of the feed material be of uniform size and character. While powdered starch is advantageous to secure uniformity of composition of the product, this form of material, i.e., a fine powder, entrains air which it is difficult to separate from the powder. We have found that preheating to about 90° to 180° F. reduces the apparent viscosity of the air and facilitates separation.

It is important to avoid localized regions of hardness due to uneven compression as is the case where longitudinally fluted rolls or pocketed briquetting rolls are employed. Such localized regions of hardness yield particles the characteristics and qualities of which are different from those of the remainder of the compressed material. Thus, if parts of the compressed body of starch have been partly gelatinized or modified by pressure and/or heat and/or moisture, the starch will give uneven results with respect to dispersal in water, etc.

Consequently, we determined by experiment that roll compaction of starch would produce a product of uniform dispersibility only if there be no substantial localized over-pressure and/or local overheating in the compacting operation. That indicated to us that cylindrical rolls were necessary to get a uniformity of the character desired.

The problem of getting the smooth rolls to bite a dry, loose material, with a considerable proportion of air entrained therein, had not been successfully solved by the prior art. The obvious necessity of creating a higher degree of friction between the powdered material and the smooth surface of the rolls could not be met by known means except by going to a diameter of rolls that would be likely to do so much work upon the material as to endanger the resulting composition and physical properties of the material, as, for example, by gelatinization of the starch due to overheating. Cooling of the rolls would not adequately solve this difficulty in the production of a dense cohesive sheet or flake of the desired thickness. Hence, rolls of relatively small diameter were desired, but the smaller the diameter, the more difficult to get the rolls to bite the material whereby to feed the same.

We undertook to increase the pressure of the feed material against the smooth surface of the rolls to improve the bite. This was done by employing a screw type of feeder that advanced the material under progressively increasing pressure until it arrived in a confined space in open communication with the bite of the rolls. We found that the entrained air in the powdered material tended to reduce the coefficient of friction of the powder with the rolls, since obviously to the extent that air was in contact with the surface of the rolls, the friction at such area of contact would be extremely low. This would appear to call for greatly increasing the feed pressure. We discovered that the air in the material being pressed and forced into the bite of the rolls tended to concentrate in the middle plane of the sheet, that is, along the center between opposite wall surfaces of the sheet or flake. This kept the grains of the powdered material from contact under full mechanical pressure, since part of the compressive force was sustained by the compressed entrained air, and the compacted sheet split apart in the middle after passing through the rolls.

The problem of forced feeding of the loose starch with entrained air in itself presented a problem, due to the greater fluidity of the air and powder mixture under the stirring of the feeder.

Removal of the air prior to pressure feeding was impractical because no suitable method was available. We then discovered the necessity for subjecting the air-containing powder to pressure great enough to provide the entrained air with sufficient energy to flow through restricting means which offered resistance to the passage of the powder therethrough but permitted the escape of the gas.

By utilizing the compression of the air-containing powder for deaeration and for simultaneously pressing or forcing the deaerated powder into engagement with the bite of the rolls, we found it possible to produce upon relatively small diameter rolls (20 inches) a dense sheet of compacted starch of a thickness of from about 0.02" to 0.2" and of substantially uniform density from side to side with no hard spots or local overheating. The release of the air from the material a short distance in advance of the bite of the rolls where high pressure upon the entrained air charged it with the energy necessary for it to effect escape, provided the most effective mode of air separation. At the same time, delivery of the deaerated material into contact with the smooth surface of the rolls and into the bite of the rolls, secured sufficient friction of the deaerated material against the surface of the rolls to assure steady non-chattering feed and delivery of a first class product.

The process of this invention has been successfully applied to unmodified corn starch (maize), to unmodified sorghum grain starch, to modified corn starch and to pre-gelatinized spray-dried starch. It is considered to be applicable to unmodified starch of an origin.

We do not intend to limit the invention to starch or its derivatives as the material to be compacted, but contemplate the application of the invention to very finely divided materials containing air or other gases entrained therein and which hinder or prevent compaction and which materials when degassed are capable of being compacted by pressure of the rolls.

The continuous deaeration under pressure of the finely divided material, such as starch, to permit it to be compacted by pressure operating either intermittently or continuously, is, so far as we are aware, a new procedure in the art. According to our preferred practice, we employ it in connection with smooth cylindrical rolls in operating upon loose starch without any additive serving as a binder, but it may be used with corrugated rolls or other compacting means, and it may be used where the finely divided material includes a binder. The true scope of the invention is to be ascertained from the appended claims.

A further object of the invention is to produce deaeration of loose air-containing starch or like material, and particularly to accomplish this deaeration in preparation for or in the course of compacting the material into a cohesive mass. This action is preferably accomplished by squeezing or pressing the air containing starch against a wall of porous material which prevents the escape of the starch through the pores of said wall, but permits the air to escape therethrough.

A further object of the invention is to compact a mass of deaerated starch granules into a dense cohesive flake. A further object is to produce a flake of compacted starch granules, which flake and the fragments thereof are of substantially uniform density throughout.

A further object of the invention is to control the conditions of pressure, moisture and temperature along with deaeration, so that a suitable high density of the compacted starch may be attained without gelatinization or other change affecting the dispersibility or other useful properties of the starch.

The deaerated starch is compacted by mechanical pressure alone, into a hard compact flake of substantially uniform density throughout, preferably by smooth pressure rolls which produce it as a sheet or flake of substantially uniform thickness. A minimum pressure of about 1500 pounds per linear inch of roll face on 20" diameter rolls is required to make the starch of 8%–17% moisture and 40° F.–180° F. temperature stick together satisfactorily. The maximum pressure for those conditions of temperature and pressure is on the same size of rolls about 15,000 pounds per linear inch of roll face. The flake or sheet produced by said roll pressure is thereafter mechanically broken up into fragments. Breaking as distinguished from crushing is employed to minimize dust formation. By screening, a desired size or range of screen sizes of particles is selected and constitutes the product. Compacting the starch granules by mechanical pressure to a high density flake and then breaking the compacted flake into grain-like fragments appears to increase the ease and the rate of dispersion of the starch in water. The fragments are screened to a range of sizes such, for example, as between about 3 mesh to about 20 mesh. The range of screen sizes may be selected to meet the customer's requirements. The compacted flake itself is similarly capable of rapid dispersion, and may be supplied, but it lacks the mobility of the fragments.

The grains or fragments of compacted starch are in the mass free flowing and being chips of hard material may be shipped, handled and poured without appreciably producing or releasing dust.

With a dry unbonded solid material, such as starch, having granules of a size of the order of 15 microns, it is not possible to avoid the production or evolution of some dust in the case of extensive shaking, handling or agitation of the product. However, in the normal handling, shipment and pouring of the product of the present invention, the evolution of dust is substantially non-existent. Freedom from the evolution of dust is desirable for good plant housekeeping, since the accumulation of starch dust is unsightly and unsanitary. Moreover, dust in the air can be dangerous. In specific industries, such, for instance, as the brewing industry, starch dust particles may serve as a vehicle for growth of undesirable bacteria or moulds. In connection with general or household use, freedom from dust is consistent with cleanliness and nicety.

While the bare fact that certain powdered material may be compacted by pressure into a relatively hard, dense product, as in tabletting pharmaceutical materials, is known, no useful result has flowed from that knowledge, so far as concerns the production of a dustless starch. Not only must the starch be rendered dustless, but it must retain all the favorable qualities of the original material, and gain improved mobility and dispersibility. If the density of the compacted flake exceeds a rather critical value somewhere around 95 pounds per cubic foot, the dispersibility of the product is adversely affected, i.e., it is slowed down or interfered with. The limits of density for a satisfactory product are 65 to 95 pounds per cubic foot lump density. Values within this range are selected to meet customers' requirements.

We have found by experiment that the factors of pressure, temperature and moisture content are to some degree interrelated, and must be controlled to avoid changing the character of the material operated upon, i.e., starch. It is known empirically that increased temperature of the starch entering the rolls increases the degree of cohesion, as shown by the production of a harder and denser flake. It is also known empirically that increases in pressure, temperature, and moisture conditions increase the tendency toward starch gelatinization.

The marketing of this type of product requires a high rate of production, but prior to the present invention, no means suitable for production of compacted starch in volume was available. We undertook to pass the loose starch between concurrent compacting rolls operating at the same speed, since this afforded the possibility of a high rate of production. We immediately encountered difficulty in the operation of compacting rolls from several directions. First, the loose powder refused to enter the bite of the rolls for any substantial thickness of flake or sheet. Too thin a flake or sheet is undesirable because the thin layer of starch is too sensitive to any inequalities of the feed material and volume of production tends to be too low. With entrapped air, it is hard to get the loose powder into the bite of the rolls, for the tendency is to avoid entry into the zone of pressure. Also too great a tendency to form fines is involved where the flake is too thin.

We finally solved this difficulty by providing means for positively forcing the powder to enter the bite of the concurrent rolls. Our initial experiments employing forced feeding were made on relatively short smooth rolls 6 inches long and 20 inches in diameter. We found that with forced feeding of those short rolls, we could produce fairly good results with a sheet or flake of substantial thickness, since due to the thickness of the flake and short distance edgewise toward the ends of the rolls there was less tendency to entrap the entrained air. But with a roll length of 20 inches, the results of forced feeding alone were not satisfactory. We found that forced feeding was necessary to fill the gap at the high roll pressures desired, and forced feeding in conjunction with deaerating means was needed to get enough of the entrained air out of the powder to produce a solid coherent flake of substantially the same density at the center as at the exposed surfaces.

The thickness of the flake or sheet may be greater or less than that of the particles or fragments to be produced. It is generally desirable as taught in the specific embodiment herein disclosed to make the thickness of the flake small enough that the desired particles or fragments of the finished product can be produced by breaking the flake as distinguished from crushing the flake or parts of the same. Crushing or excessive impacting tends to produce an unnecessarily large proportion of fines. Fines are objectionable. However, reduction of the thickness of the flake or sheet to a value below about 0.02 inch or less appears to render the starch in the flake much more sensitive to any unevenness in the starch feed texture with subsequent gelatinization or incipient gelatinization in parts of the same.

We conceived the possibility of providing a porous wall in contact with the feed material in the region of flow of the material under pressure towards the bite of the rolls. The gases which it is desired to evacuate pass through the pores of the wall, but starch grains are retained. The clogging of the pores is minimized or prevented by the continuous scouring of the surface of the porous wall by the moving stream of material under high pressure.

It is an object of the present invention to provide a process and means for compacting starch and like materials with continuous discharge under pressure of entrained air from the feed material while it is fed into the bite of the rolls under pressure.

It is a further object of the invention to provide a process and means for precompressing the starch and entrained air and to vent the air from said precompressed starch and then compacting the starch into a dense, hard, dustless flake.

It is a further object of the invention to provide a novel form of gas liberating means for deaeration of pulverulent materials.

The manner in which we attain the objects above enumerated and others which will be apparent later will now be explained in connection with a description of the preferred embodiment of the invention.

In order to acquaint those skilled in the art with the manner of constructing and practicing our invention, we shall describe, in connection with the accompanying drawings, a specific embodiment of the same.

In the drawings:

FIGURE 1 is a flow diagram of the various steps of the process;

FIGURE 2 is a schematic layout of the equipment for performing the operations indicated in FIGURE 1;

FIGURE 3 is a diagrammatic showing of the force feeder and the compacting rolls cooperating with the same;

FIGURE 4 is a diagram of the rolls with the deaerating vane or bar disposed adjacent the bite of the rolls;

FIGURE 5 is a diagrammatic showing of the means for spacing the rolls and holding them under predetermined hydraulic pressure;

FIGURE 6 is a vertical section through one form of force feeder for feeding the pulverulent material to the rolls;

FIGURE 7 is a horizontal cross section on the line 7—7 of FIGURE 6;

FIGURE 8 is a side elevational view of a deaerating panel on the forced feeder;

FIGURE 9 is a horizontal cross sectional view on the line 9—9 of FIGURE 8;

FIGURE 10 is a vertical longitudinal section taken on the line 10—10 of FIGURE 8;

FIGURE 11 is a side elevational view of the deaerating vane;

FIGURE 12 is a top plan view of the same;

FIGURE 13 is a cross sectional view taken on the line 13—13 of FIGURE 11;

FIGURE 14 is a cross sectional view taken on the line 14—14 of FIGURE 11; and

FIGURE 15 is a plan view of a mass of loose fragments of compressed starch according to the present invention.

FIGURE 16 is a face view in elevation of a modified form of cheek plate embodying a deaerating panel; and FIGURE 17 is a vertical section on an enlarged scale taken on the line 17—17 of FIGURE 16.

The steps of the process, and the order and the manner in which they occur, are indicated in FIGURE 1.

A layout of means which is suitable to carry out the aforesaid process steps is indicated in FIGURE 2.

The product is illustrated in FIGURE 15.

As indicated in FIGURE 1, starch is fed from the flash dryer where the final removal of water from a starch slurry is performed. This starch is essentially a powder consisting of granules of starch substantially of the form in which they occur in nature, although they have been separated from other materials, notably gluten and fiber. These small bodies or particles of starch in terms of art are generally referred to as "granules". See "Chemistry and Industry of Starch," second edition, by Ralph W. Kerr, edition of 1950, by Academic Press, Inc., publishers. Starch granules are reported to vary in size from about 2 microns to about 150 microns. Corn starch, with which this invention is largely concerned, consists of granules of a mean size of approximately 15 microns.

The starch from the flash dryer is conveyed to the feed heater 1, where the starch is pre-heated. One effect of preheating is to reduce the viscosity of the entrapped air in the feed starch. In the step of preheating the temperature is raised to between 90° F. and 180° F. The moisture at this stage is normally maintained at 8% to 14%. The feed heater 1, which is supplied with feed from the flash dryer, as indicated in FIGURE 2, consists of a conveyor, which may, for example, be a screw conveyor, with a heating jacket for hot water. It delivers the warmed starch to a distributor 2, which in turn supplies the pre-heated starch to the force feeders 3, 3. These force feeders 3, 3 are preferably vertical screw conveyors for forcing the starch into the roll compacters 4, 4. These roll compacters essentially comprise housings in which there are contained the compacting rolls 18, 18 (see FIGURE 3) into the bite of which the force feeders 3, 3 compel the starch to flow. The starch is compacted into a flake or sheet issuing from between the compacting rolls into flake breakers 5, 5, which break up the flake or sheet into coarse pieces and deliver the same to the fragmenting mills 6, 6. These fragmenting mills 6, 6 break up the larger pieces of flake coming from the flake breakers 5, 5 and reduce the size of the pieces to where the major amount of the starch fragments will be of a size between 3 and 20 mesh per inch. The flake breaker 5 and the fragmenting mill 6 may consist of pairs of rolls with inter-digitating teeth of a proper size to reduce the flake to fragments of the range of sizes above indicated. Alternatively, a hammer mill employing a knife type of hammer may be used for this flake breaking operation. Such devices are of the prior art. Such dust as is produced by the flake breakers 5, 5 and by the fragmenting mills 6, 6 may be removed by controlled air currents in a "dedusting" operation. From the fragmenting mills 6, 6, the compacted starch in fragments is delivered to a belt conveyor 7. These fragments in appearance resemble small chips of white marble. The milled compacted product is delivered by the belt conveyor 7 to a bucket elevator 8 which at its upper end delivers the milled compacted product to oscillatory screens 9, 9. The screens 9, 9 discharge the milled product in three sizes to corresponding conveyors 11, 12 and 13. The conveyor 11 receives so called "insize" fragments, which are then delivered to a packaging station 14, where the product is bagged for commercial purposes. The "insize" fragments conveyed to the packaging station 14 are those which are passed by a 3 mesh screen and retained on a 20 mesh screen, as indicated in FIGURE 1. The fines which pass through a 20 mesh screen are delivered to a surge hopper 15 for recycling the fines to a feed hopper 16, which in turn delivers the fines along with the starch from the flash dryer to feed heater 1. The over-size fragments are received by the screw conveyor 12 and are delivered thereby to the fragmenting mill 17 which is constructed like the fragmenting mills 6, 6, and which reduces the over-size fragments to smaller sizes and delivers them to the belt conveyor 7, and they are in turn, along with the product of the fragmenting mills 6, 6 delivered to the bucket elevator and rescreened at the oscillatory screen 9, 9.

Referring now to FIGURE 3, which shows diagrammatically the roll compacter 4 and its force feeder 3, two cylindrical rolls 18, 18 with smooth or etched surfaces are driven by common drive means (not shown) to rotate at the same speed toward each other, that is, in opposite directions around their longitudinal axes, to effect a bite or nip between them. A suitable housing (not shown) encloses these rolls, essential parts of which housing are the end plates 19, 19, see FIGURES 3 and 4, which form cheek pieces or end plates enclosing the ends of the trough formed between the rolls 18, 18. Additional walls for completely enclosing the rolls and connected parts and a machine frame of any conventional or suitable form for supporting the operating rolls and other parts will be provided, as will be understood by those skilled in the art. Cooperating with these end plates or cheek pieces 19, 19 is a lower part of the force feed housing of the force feeder 3 known as the transition section 22. The force feeder 3 is a screw conveyor consisting of one or more cylindrical sections 21, conical feed section 23 at the top, and a transition section 22 at the lower end. Within these housing sections there is disposed a suitable feed screw 24, consisting of a conical flight 25 and a cylindrical flight 26. Both are mounted upon a vertical drive shaft 27, which extends down to the lower end of the feeder 3. The transition section 22 is formed with a cylindrical upper end 28, and a rectangular lower end 29 with the walls in between merging from the rectangular to the cylindrical, whereby the material forced downwardly by the feed screw 24 is delivered substantially uniformly throughout the valley between the rolls 18, 18. The conical or hopper section 23 at the upper end has a cover 31 through which the shaft 27 extends. Also, there is provided a supply tube 32 through which the starch supply enters the feeder. An air vent 33 in the cover 31 is provided for venting air or such other entrained gas as becomes freed from the entering material.

In FIGURES 6 and 7, we have indicated the force feeder 3 as provided with flow controlling vanes 35, 35 in the housing section 21 between adjacent sections of the conveyor screw 24. These vanes which are optional, are flat plates with rounded advance edges and they lie in planes extending through the longitudinal axis of the feeder. Similar vanes 36, 36 are shown as disposed below the lower end of the feed screw 24 in advance of the movement of the material into the transition section 22. The purpose of these vanes is to offer resistance to rotary motion of the material being fed, and to cooperate with the feed screw in forcing the material to move downwardly into the valley between the rolls and eventually into the bite of the rolls. These vanes 35, 35 and 36, 36 are not essential and may be omitted.

The loose powdery material, in this case the starch, tends to entrain air or other gases in contact with it to such an extent that when the material is subjected to the necessary pressure to produce compaction, the entrapped air, if not vented or removed in some other manner, will tend to keep the particles from full pressure contact with each other and upon release of the mechanical compacting pressure, to disrupt the flake or compacted mass by its expansion. Since the pressure which is put upon the starch in the bite of the rolls would normally run between 3,000 and 10,000 pounds per linear inch of roll, it can be seen that gas compressed to this pressure will, if the restraint is rapidly released, disrupt the flake or particle which is formed by such compaction.

The means for venting the entrapped air from the starch in the course of its compression and final compaction includes not only the open air vent 33 above referred to, but more particularly includes means for venting the air from a moving mass of the powder-like material. A deaerating vane or bar 38 which may be variously constructed, but one form of which is shown in the attached drawings, see particularly FIGURES 3, 4 and 11 to 14 for one form of such a device. The bar or vane for best effect is disposed in the valley between the rolls 18, 18 immediately above the bite of the rolls where the pressure of the feed material entering the rolls approaches the pressure occurring in the bite of the rolls. The ends of the deaerating vane 38 are carried on the adjacent end plates 19, 19.

The deaerating vane 38, illustrated diagrammatically in FIGURES 3 and 4 and in detail in FIGURES 11 to 14, comprises two plates of porous metal 39, 39 with a metallic woven wire screen 40 between them to operate as pervious spacer for the plates. The porous metal has pores of a mean size between about 20 to 50 microns. The lower edges, the side edges, and a part of the top edges of these two plates 39, 39 are sealed over at 42 by stainless steel welds or with silver solder or the like. A solid steel reenforcing plate 43 is disposed edgewise to the upper edges of the two porous plates 39, 39, and is welded along its lower edges to the upper edges of said porous plates to support them against the downward pressure of the flowing material driven by the feeder 3 into the bite of the compacting rolls 18, 18. The plate 43 is secured and sealed as by silver solder at its lower edges 44, 44 to the upper edges of the porous plates 39, 39. At the outer ends of the solid bar or plate 43, tubular connections 45, 45 in the form of short nipples are welded to the plates 39, 39 and to the ends of the bar or plate 43. These nipples 45 communicate with the space between the plates 39, 39. Pipe couplings 46, 46 are connected by means of threads to the upper ends of the nipples 45. The nipples 45 and couplings 46 are welded at their adjacent sides to the respective ends of the plate or bar 43, and upon their outer sides to lugs 47, 47, which are also welded to the upper edges of the plates 39, 39. Air venting pipes 48, 48 are threaded into the couplings 46, 46 and lead to the outside of the casing for permitting air from the space between the porous plates 39, 39 to be vented to atmosphere or be drawn out under vacuum through said nipples 45, 45, couplings 46, 46 and vent pipes 48, 48.

The deaerating bar or vane 38 is preferably supported at its ends by connection to the adjacent end plates 19, 19, as shown in detail in FIGURE 11, and thence to the machine frame. The lugs 47 which are welded to both the porous plates 39, 39 and to the reenforcing bar 43 through the intermediary of the nipples 45 and couplings 46 are provided with bolt holes 49, 49 which register with similar holes in brackets or flanges 50, 50 mounted on the mentioned end plates 19, 19 above the rolls 18, 18.

For the same purpose of causing or permitting the venting of entrained air, porous walls in contact with the flowing material under some degree of pressure may be provided, for example, in the cylindrical casing of the feeder 3. For this purpose, an opening is formed in the cylindrical wall of the section 28, see FIGURES 6, 8, 9 and 10. Preferably, this is an oblong rectangular opening. Into it is fitted a porous plate 52 which is suitably curved and which lies flush with the inner surface of the wall of the section 28 served by the fed screw portion 26. This porous metal wall 52 is connected mechanically through an intervening spacer 53 to the cover plate 54, which cover plate and spacer are made of impervious metal. The edges of the cover plate 54 extend over the margins of the cylindrical wall 28 about the opening and said overhang or flange portion is clamped to the outer surface of the wall 28 by cap screws 55. A threaded nipple 56 for connection with a vent pipe to atmosphere is provided at the central portion of the said plate 54. The inner portion wall member 52, the spacer 53 and the plate 54 are suitably welded together to form a structural unit. Such gas venting units as the one shown in FIGURES 6, 8, 9 and 10 may be disposed at locations around the circumference of the wall 28, or may be disposed at any other suitable part of the conveyor housing or the transition section 29 where the material, such as starch, with entrained gas, such as air, is put under pressure.

As shown in FIGURES 6 and 10, the housing of the feeder 3 is supported from the frame in which the rollers 18, 18 are mounted by means of a pair of spaced channel bars 37, 37 extending parallel to the axes of the rollers 18, 18. These channel bars 37, 37 are attached at their central portion to the housing of the feeder 3, and are attached at their ends to the frame (not shown) which support the shafts 57 of the rollers 18, 18 and the cheek plates 19, 19. The function of the air venting plugs or inserts shown in FIGURES 6, 8, 9 and 10 is to allow the escape of air from the material as it is being put under pressure by the feeder worm or screw as it is forced into the bite of the rolls.

In order to obtain a predetermined pressure upon the material passed betwen the rolls, it is necessary that the rolls be loaded, that is, forced towards each other under a predetermined loading, whereby the material will be compacted. Likewise, they must be spaced from each other at that loading in order to secure a flake or sheet of predetermined thickness. Thus assume the flake or sheet of a thicknes of 0.20 inch is desired, and a pressure of from 3,000 to 10,000 pounds per inch of length of the rolls be exerted upon the material produced, suitable means for corresponding loading and spacing of the rolls are required. In FIGURE 5 we have indicated diagrammatically how the rolls may be loaded and spaced. The shafts 57, 57 of the rolls 18, 18 are mounted in blocks or journal boxes 58, 59, with a spacer 60 between the adjacent journal boxes 58, 59, so as to space the rolls apart by a predetermined distance. This spacer 60 may be in the form of one or more shims, or it may be a wedge or the like to provide an adjustability of the gap between the rolls. As shown in FIGURE 5, the wedge 60 is adjustable by means of a screw 62 for controlling the spacing of the rolls. Pressure from a hydraulic accumulator 63, partly filled with air, is exerted upon the journal box 59 by means of the cylinder 64 and piston 65 which latter presses against the said journal box 59, in accordance with the pressure prevailing in the accumulator 63. This pressure may be determined by inspection of the gauge 66 which is graduated in terms of roll pressure per unit of length, or any convenient factor of compacting force, and it may be adjusted by means of an adjustable pressure release valve 67. A continuously running pump 68 delivers a small amount of liquid under pressure to the accumulator 63, subject to the opening of the pressure release valve 67 which returns the liquid to the reservoir 69. A similar cylinder with pressure supplying and indicating means is applied to the opposite end of the shaft 57 of the roll mounted in the movable journal blocks 59, so that the two ends of the single adjustable roll will be similarly controlled and equally loaded at the same time.

The flake breaker 5 is of known form and construction, and may consist, for example, of a pair of studded rolls which are driven in unison, rotating towards each other, and breaking up the flake or sheet into relatively coarse fragments. Alternatively, the teeth or studs on the rotating roll may pass through stationary teeth mounted on the inside of a housing for the roll. The fragmenting mills 6 may be of any type suitable for subjecting the broken flake or sheet to a fragmenting action which is designed to result in a large proportion of the fragments being able to pass, for example, a three mesh per inch screen and to be held, for example, on a 20 mesh per inch screen to constitute the desired product. In FIGURE 15, we have shown the general appearance of the fragments 72 of the commercial products, namely, compacted fragments of a size of minus 3 plus 20 mesh. This range of sizes of the fragments gives substantially minimum dispersing time. For longer dispersing times, larger size or smaller size fragments may be produced. Alternatively, the fragments may be composed of a more highly compacted material.

The pressure gauge 66 may be common to the two ends of the adjustable roll, or a gauge individual to each end of the adjustable roll may be provided, particularly where each end has its individual control valve. These gauges may be graduated in terms of pounds per inch of the length of the matching faces of the rolls, or other suitable indication of the unit pressure applied to the starch. The two rolls 18, 18 are geared together and driven in unison by variable speed driving mechanism not shown.

From a practical standpoint, it is difficult and inconvenient to make a determination of the pressure in pounds per square inch of the bite of the rolls upon the starch. It is convenient to measure the pressure applied to the rolls in terms of pounds per lineal inch of the working faces of the rolls. Where the rolls are filled with starch the pressure on the rolls is also the pressure upon the starch. Consequently, the latter method of designating pressures is employed in practice.

The deaerating vane 38 is disposed close to the bite of the rolls, considering at the same time that the starch must be permitted to flow freely into the bite of the rolls. We have explored the pressures prevailing in the material being operated upon, and find that the air pressure in the material approaching the bite of 20 inch diameter rolls stands at about 20 inches of water at about 7 inches from the bite of the roll, and rises to about 37 inches of water at 5 inches from the bite of the rolls, and then rises rapidly to about 80 inches of water at 2½ inches from the bite of the rolls, and about 150 inches of water at 2 inches from the bite of the rolls.

In FIGURES 16 and 17 we have illustrated a modified cheek plate 19' which serves not only to close off the ends of the valley between the rolls 18, 18, as do the cheek plates 19 in FIGURES 3 and 4, but serves also as a means to evacuate air from the compressed starch in contact with the inside surface of said plate. The body of the cheek plate 19' has a shallow recess 74 formed in or routed out of the inner face of the same. This shallow recess is formed to a uniform depth to receive a deaerating panel 75 in the form of an inlay of ⅜ inch thick porous sheet 75 of sintered bronze having a mean pore size of from 20 to 50 microns. This inlay is held in place by a series of flat headed countersunk machine screws 76, 76. The edges of the inlay may be brazed or welded to the edges of the recess, but we find that such sealing of the edges is not essential. The end faces of the rolls 18, 18 preferably overhang the edges of the inlay. Passages 77, 77 for the escape to atmosphere of air forced through the porous inlay 75 are drilled vertically into the body of the cheek plate 19' and communicate with the inside surface of the inlay plate 75. At their outer ends, the passageways terminate in sockets 78 threaded to receive ⅛ inch pipe. Pipes threaded into said sockets lead to atmosphere as does the pipe 48 shown in FIGURE 3 to vent whatever gas is forced through the porous plate. The gap between the back of the inlay 75 and the bottom of the recess 74 is sufficient to allow air to escape to and through the passageways 77. Shallow grooves radiating from the passageways may be employed. Whatever deaerating means be employed, it should not interfere materially with the free flow of the feed material to the bite of the rolls.

In a typical run of the process and employing the above described equipment in performing the same, compacted starch flakes were produced at the rate of 200 pounds per minute per machine, using rolls which were 20 inches in width and 20 inches in diameter and had smooth cylindrical surfaces. The force feeder comprises a casing having a conical upper end and a cylindrical lower end communicating with a transition section. A screw or worm of approximately 19 inches in diameter for the cylindrical portion of the feeder was operated at 25 to 50 revolutions per minute. The worm in each section fits with a mechanical clearance. Longitudinal ribs or grooves may optionally be employed on the inner wall of the feeder casing to cooperate with the worm in driving the material forward, i.e., down. The deaerating vane 38 was disposed approximately 7½ inches above the bite of the rolls during operation. Gas pressures as high as 6 p.s.i.g. were found to occur in the valley of the rolls and solids pressures as high as 35 p.s.i.g. were found within the transition section of the force feeder. The solids pressures were highly directional because of the flow of the material.

The force feeder must supply the starch to be compacted at a rate such that loose starch cannot pass uncompacted through the roll spacing, but instead, it will be bitten by the rolls and must be compacted in order to pass therethrough. Total production rates of material passed through the rolls ranged from 75 to 240 pounds per minute with the rate of flake production ranging from 40 to 174 pounds per minute. The rolls were operated at speeds ranging from about 12 r.p.m. to 25 r.p.m. for the aforesaid production. Flake yields ranged from 40 to 87% of the through-put.

In a second typical operation of the process and the equipment for performing the same, the force feeder 3 consisting of a conical section 23, a cylindrical section 21 and a transition section 22, employed a double worm having the diameter of the cylindrical portion of the feeder approximately 20 inches. It was operated at a speed of 26 r.p.m. The feed temperature of the starch delivered to the conical portion was approximately 144° F.

The compacting rolls of 20 inch diameter, 20 inches long, were operated at a speed of 28 r.p.m., with bearing pressure providing pressure of 10,000 pounds per inch of length of the rolls.

The flake breaker 5, consisting of a series of moving fingers interdigitating with a like series of stationary fingers, was operated at 200 r.p.m. The fragmenting mills 6, 6 which received the broken flake directly from the flake breakers 5, 5 were operated at a speed of 1000 r.p.m. with screen openings of ⅞ inch. The rate of flow through the compacting rolls to the flake breaker 5, 5 for both compacters was 400 pounds per minute. The flake content of the through-put was 85 to 90% and the flake thickness was 0.15 inch. The oscillatory screeners 9, 9 employed top deck screen openings of 3 inch mesh, and bottom deck screen openings of 20 inch mesh.

Coarse flake discharged from the rotary screener's top deck to the coarse screw conveyor 12 was at the rate of 150 pounds per minute. Production of the "insize" product from the rotary screeners 9, 9 was at the rate of 300 pounds per minute. The recirculation of fines to the fines recycle feed hopper 16 and coarse fragments to the fragmenting mill 17 accounts for the overlap of these figures.

An analysis of the bagged product produced from modified corn starch showed the following:

(1) Moisture, percent_____ 10.0.
(2) Wet grit, percent (D.B.)_____ 0.23.
(3) Dustiness_____ 0.63.
(4) Dispersibility_____ 1 min. 15 sec.
(5) Bulk density, lb./cu. ft_____ 49.
(6) Solubles, percent (D.B.)_____ 0.60.
(7) Lump density, lb./cu. ft_____ 87.

Analysis of the bagged product produced from raw corn starch showed the following:

(1) Moisture, percent_____ 9.7.
(2) Wet grit, percent (D.B.)_____ 0.68.
(3) Dustiness_____ 0.75.
(4) Dispersibility_____ 1 min. 30 sec.
(5) Bulk density, lb./cu. ft_____ 50.
(6) Solubles, percent (D.B.)_____ 0.35.
(7) Lump density, lb./cu. ft_____ 86.

The "dustiness index" is a comparative figure determined by subjecting a predetermined quantity of the material under consideration to a predetermined agitation as by rolling in a drum at a predetermined speed for a given period of time with a predetermined current of air flowing over the material under agitation. The dust is recovered and weighed, or alternatively the loss of weight of the charge may be taken as the "dustiness index." Dispersibility is a measure of the time following the introduction of a starch sample into water with agitation within which all lumps disappear under standard empirical conditions.

The usual bulk density of lump starch of the prior art is of the order of 30 to 40 pounds per cubic foot, and the lump density of the same is about 70 pounds per cubic foot. The limits of density for a satisfactory product made according to the present invention are about 65 to 95 pounds per cubic foot lump density. The moisture will ordinarily be controlled to about 11 to 12%, but sometimes the customer may want a moisture content as low as 8, or as high as 13 to 15. This may readily be provided.

The surface of the rolls is normally etched to give it a slight degree of roughness to increase friction, and if it is found that the flake tends to adhere to the surface of the roll, a scraper blade or blades may be employed.

Deaeration for commercial operations is found to be necessary to maintain a satisfactory rate of production. We have found that with the deaerating vane 38 constructed and employed as above disclosed, the flake content of the output of the rolls runs as high as 90% with the 20 inch rolls of a 20 inch length. The porous metal of which the plates 39, 39 and the plate 52 are constructed consists of a mass of powdered metal, the particles of which are sintered together to leave pores or openings of from 20 to 50 microns in cross sectional dimension or diameter.

The porous metal may be bronze or stainless steel, or may be other corrosion resisting metal or alloy. The mean pore size is about 20 to 50 microns. The mean diameter of starch granules employed in this process is of the order of 10 microns. In the 20 by 20 inch set of rolls, a total pressure of from 75,000 to 100,000 pounds on each bearing of the above described machine was available. Such high pressures are not required for any usual flake formation.

The advantages of the product of the present invention reside chiefly in the dustless character and mobility of the product, the high bulk density and the short dispersion time for dispersion of the starch in water. The use of the present process does not change the viscosity of the dispersed starch slurry.

A further advantage of the present product is the low wet grit content thereof as compared with other commercial forms of starch. On tests which we ran on this product, the wet grit content at 25° C. increased from 0.02% in the feed starch to 0.07% and 0.05% in the roll compacted product. The significant fact is that compacting the starch by this method does not contribute materially to the formation of additional grits. The bulk density of the product will vary with the particle size and the size distribution in the product as marketed. Samples of the fragmented product which we have tested vary between 48 and 52 pounds per cubic foot. The density of the lumps of compacted starch, that is of the flake, has ranged from 75 to 90 pounds per cubic foot.

The "lump density" of several other starch products in pounds per cubic foot for comparison is as follows:

| | |
|---|---|
| Lump laundry starch | 70 |
| Pearl starch | 60 |
| Crystal laundry starch | 66 |
| Cube starch containing binder | 75 |
| Tabletted corn starch | 75–85 |

The bulk density of these other products varies so widely with particle size and range resulting from subsequent grinding and screening operations that the values would be of no significance. The starch entering the force feeder will ordinarily enter at a moisture content of from 8 to 17%, and a temperature of from about 40° F. to 180° F. The starch issuing from the rolls has been found to have a decrease in moisture content of from .2 to 1½%.

We have compared the time for compacted starch of given dimensions and bulk density to disperse in water and compared the same with known compacted starches. Comparative tests using an empirical dispersing test technique on several starch products have been made. The following shows the comparative times in minutes for dispersion:

| | |
|---|---|
| Roll compacted starch | 0.5 to 1.4. |
| Lump laundry starch | More than 5. |
| Pearl starch | 2. |
| Crystal laundry starch | More than 5. |

No attempt was made when these tests were run to control the particle size range distribution.

Tests have been run to determine whether or not the starch granules have been damaged during compacting, including gelatinization, and we have compared the result with that of other known products.

Samples of roll compacted starch according to our invention were compared with the starting flash dried starch by all known analytical methods, namely, Scott viscosity, wet grit, intrinsic viscosity, Brabender viscosity curves, enzyme Scott, solubles and microscopic examination. No significant differences were detected, except for a tendency towards reduction in enzyme Scott. We do not regard this latter observation as of any significance as evidence of damage.

It appears that dissipation of heat occurs at a satisfactory rate, so that no special provisions for heat removal are required, and no gelatinization has been detected.

The present invention is applicable to all types of amylaceous and farinaceous materials in dry powdered form. Examples of amylaceous materials are all types of starches in unmodified form, e.g., corn (maize), wheat, rice, tapioca, grain sorghum, potato, and the like. The starch granules in such materials should be in their original form in order that the material will readily redisperse in water after compacting. The starches may be chemically modified, e.g., oxidized or acid modified. Also the starch may be derivatized. By derivatives of starch we mean starch compounds where substituent groups, either organic or inorganic, have been introduced into the starch molecules. Examples include starch sulphates, starch phosphates, hydroxyethyl ether of starch, carboxymethyl starch, and the like. Dextrins may also be used. Examples of farinaceous materials include wheat flour, rye flour, corn (maize) flour, and the like.

In the foregoing disclosure, and in the following claims, we employ the term "starch" in reference to the material compacted. We do not intend that the term shall be limited to unmodified starches, but wish it understood that the term as used includes not only various physical forms of starch, but also all chemically modified starches which retain, or have a granule form such as to compact under pressure to a useful degree according to the method herein disclosed and claimed.

We do not intend to limit the application of the broad aspects of the process, nor the use of the means herein disclosed, to starch as above defined, but wish it understood that the same are applicable to compacting a wide variety of pulverulent materials, such as dextrins and polyoses. It is contemplated that the process and means may be applied to compacting other materials capable of compaction, for example, dry feed products, such as gluten feeds, the other dry products, such as protein, zein and the like, and chemical products, such as methyl glucoside and the like.

While we have described a specific embodiment employing rolls of 20 inch diameter 20 inches long, operating at about 20 to 40 r.p.m., and have expressed the pressures applied to the bearings, and hence acting on the starch passing between the rolls in terms of pounds per unit length of the rolls, it is to be understood that this is by way of illustration and not of limitation. Rolls of greater or less diameter and/or length may be employed without departing from the invention. It is difficult to obtain a direct determination of the actual pressures, in absolute terms, applied to the starch in the bite of the rolls. The practical way to arrive at the required pressure is to set the conditions of moisture, temperature, roll spacing and speed at values comparable to those above given for specific operations, such as temperature about 90° to 180° F. and moisture about 10 to 12%, flake thickness of about .15 inch to .20 inch, and roll surface speeds comparable to those of 20 inch rolls operating at about 28–30 r.p.m. with corresponding force feed delivery at pressures great enough to fill the rolls and then adjust the roll pressure to obtain a flake density of from 65 to 95 pounds per cubic foot. Greater pressures are required for greater density and for thicker flake production.

We do not intend to be limited to the specific features of the equipment, the process and the product above

We claim:

1. Method of continuously compacting starch into a strip of indefinite length which comprises force feeding a stream of highly mobile powdered starch with entrained air in a continuous path into a region of compaction, compressing the starch and entrained air in said stream as said stream advances toward said region of compaction, discharging the compressed air from said stream adjacent to and in advance of the region of compaction while maintaining the starch under pressure and in said region of compaction and continuously compressing the deaerated starch into a strip of compacted starch of indefinite length.

2. The method of claim 1 further characterized by preliminary heating of the loose powdered starch to reduce the viscosity of the air entrained therein.

3. The method of claim 1 wherein the stream of highly mobile powdered starch with entrained air is force fed into the bite of concurrently operating substantially smooth cylindrical rolls for compaction.

4. The method of claim 1 further characterized by breaking the dense sheet of compacted material into fragments and screening from said fragments granules of the desired range of sizes.

5. Method of continuously compacting starch into a strip of indefinite length which comprises force feeding a stream of highly mobile powdered starch with entrained air in a continuous path into a region of compaction, progressively increasing the pressure of the starch and entrained air as the stream approaches said region of compaction, continuously separating the air under pressure from the starch under pressure adjacent to and in advance of the region of compaction, and discharging the air independently of the starch while maintaining the starch under pressure, and in said region of compaction continuously compressing the deaerated starch into a strip of compacted starch of indefinite length.

References Cited in the file of this patent
UNITED STATES PATENTS

| | | |
|---|---|---|
| 520,143 | Groves | Nov. 29, 1881 |
| 2,464,081 | Hansen et al. | Mar. 8, 1949 |
| 2,843,879 | Komarek et al. | July 22, 1958 |
| 2,907,685 | Smith | Oct. 6, 1959 |
| 2,977,631 | Komarek et al. | Apr. 4, 1961 |